United States Patent [19]
Giampavolo et al.

[11] Patent Number: 6,101,687
[45] Date of Patent: Aug. 15, 2000

[54] CHILD SEATBELT ASSEMBLY

[75] Inventors: Paul F. Giampavolo, Milton, N.H.; John S. Pontaoe, Chicago, Ill.

[73] Assignee: Safe Strap Company Inc., Somersworth, N.H.

[21] Appl. No.: 09/410,538

[22] Filed: Oct. 1, 1999

[51] Int. Cl.[7] .................................................. A44B 21/00
[52] U.S. Cl. .................. 24/302; 24/265 AL; 24/615; 24/614
[58] Field of Search ................. 24/573.5, 16 PB, 24/265 AL, 265 BC, 335, 336, 339, 171, 614, 615, 598.2, 601.2, 702, 669, 302, 309; 70/457; 280/33.992, 801.1; 297/487

[56] References Cited

U.S. PATENT DOCUMENTS

| 4,802,262 | 2/1989 | Kasai ..................................... 24/615 X |
| 5,263,726 | 11/1993 | Wood ................................. 280/33.992 |
| 5,669,118 | 9/1997 | Frano et al. ......................... 24/265 AL |
| 5,709,014 | 1/1998 | Takahashi ................................. 24/614 |
| 5,781,970 | 7/1998 | Anscher . |
| 5,920,968 | 7/1999 | Anscher . |
| 5,940,944 | 8/1999 | Anscher . |

*Primary Examiner*—Anthony Knight
*Assistant Examiner*—Robert J. Sandy
*Attorney, Agent, or Firm*—Pitney, Hardin, Kipp & Szuch LLP

[57] ABSTRACT

The child seatbelt assembly is provided on-site as a single piece and includes two nylon web seatbelt portions which latch to each other by way of a releasable buckle. Both seatbelt portions are permanently affixed to strap retainers by means of sewing or attaching permanently through the seatbelt portions or through a sew-tab included as part of the strap retainers. This provides that the seatbelt portions are affixed to the strap retainers regardless of whether or not the strap retainers are in the open or closed position. This further allows the child seatbelt assembly to be provided to an installation site, such as a grocery store, as a single assembly.

4 Claims, 2 Drawing Sheets

CHILD SEATBELT ASSEMBLY

BACKGROUND OF THE INVENTION

1. Field of the Invention

This invention pertains to a child seatbelt assembly, such as is used to secure a child to a shopping cart and for other similar applications.

2. Description of the Prior Art

In the prior art, it is well-known to secure a webbing seatbelt-type child restraint apparatus to grocery cart of similar vehicle to assure the safety of children riding in the shopping cart. It is imperative that such devices are securely attached to the shopping cart without the reasonable possibility of becoming accidentally disattached. An example of a seatbelt or safety strap for such an application is shown in U.S. Pat. No. 5,263,726 entitled "Child Restraint Strap for a Shopping Cart Seat", issued on Nov. 23, 1993 to Wood.

However, the attachment of the seatbelt to the carriage is critical in several respects. The web of the belt, which may be nylon, cannot rub against metallic parts, such as the carriage or the attachment devices, as this may lead to tearing and failure of the web. This concern makes such attachment devices as metallic rings (e.g. keyring-type structures) and grommets undesirable. Additionally, the attachment devices must be simple and foolproof to install, preferably with no tools required on-site. The attachment devices must have no credible possibility of accidental disengagement. The attachment devices should have no exposed locking components which could be tampered with to the detriment of the attachment. Similarly, any exposed locking components frequently provide crevices into which food, dirt and similar material can accumulate.

U.S. Pat. No. 5,669,118 entitled "Strap Retainer" and issued on Sep. 23, 1997 to Frano, Giampavolo and Sipp has provided a device which has been quite satisfactory in many respects, but improvement is desired.

OBJECTS AND SUMMARY OF THE INVENTION

It is therefore an object of this invention to provide a child seatbelt assembly which attaches securely and permanently to a grocery cart or similar device.

It is therefore a further object of this invention to provide a child seatbelt assembly wherein the web of the child seatbelt will not rub against metal parts at the point of attachment to the grocery cart of similar device.

It is therefore a still further object of this invention to provide a child seatbelt assembly which is simple and foolproof to install.

It is therefore a still further object of this invention to provide a child seatbelt assembly which can be installed on-site with no tools.

It is therefore a still further object of this invention to provide a complete child seatbelt assembly to a site for installation, without separate or loose parts required for installation.

It is therefore a still further object of this invention to provide a child seatbelt assembly which exposes a minimum of locking components and/or crevices in the installed position.

It is therefore a final object of this invention to provide a child seatbelt assembly which is resistant to tampering.

These and other objects are attained by a child seatbelt assembly which includes a web which is provided to the installation site (that is, the grocery store or similar location) with attachment devices or strap retainers affixed to the web. The attachment devices or strap retainers are made of plastic or metal and include a relatively stiff post element which may include an integral lateral sew-tab. The web of the seatbelt is looped around the post element and is typically sewed to the sew-tab prior to shipment to the site of installation. A first end of a flexible looping element is formed integrally with a first end of the post element. The second end of the flexible looping element includes two parallel guide prongs and a detent prong. The second end of the post element includes two longitudinal guide channels and one longitudinal detent channel for receiving the respective guide prongs and detent prong. A portion of the shopping cart or similar vehicle is typically engaged therewithin.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
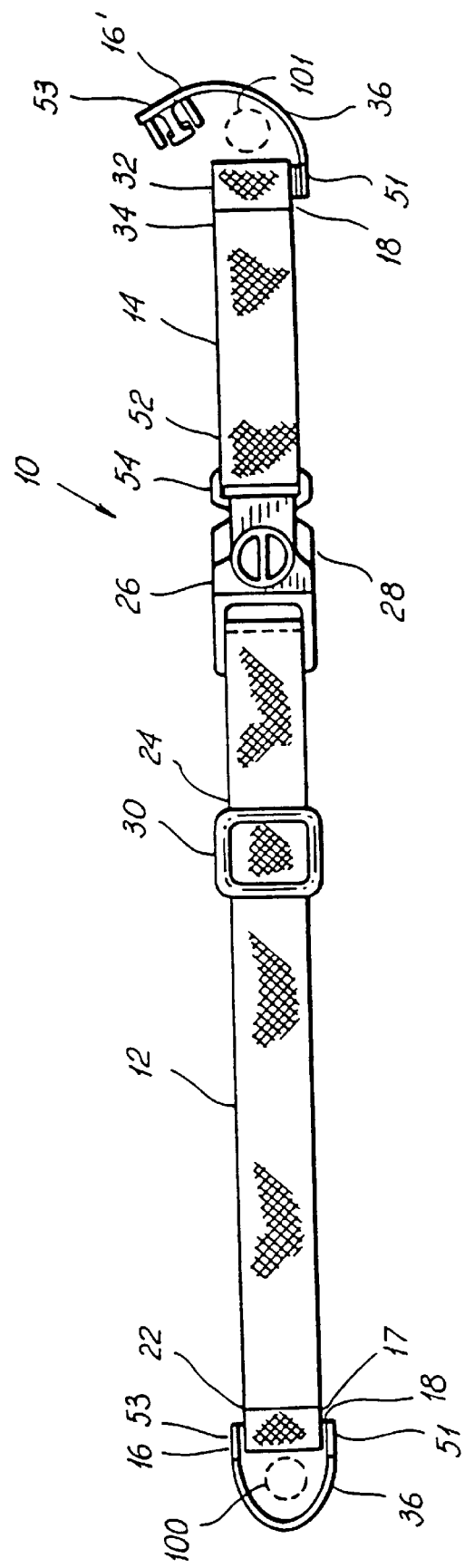
FIG. 1 is a plan view of the child seatbelt assembly of the present invention, shown with one strap retainer in an open or unengaged position and another strap retainer in a closed or engaged position. The wire-like elements of a shopping cart or similar structure are shown in phantom.
Figure 2:
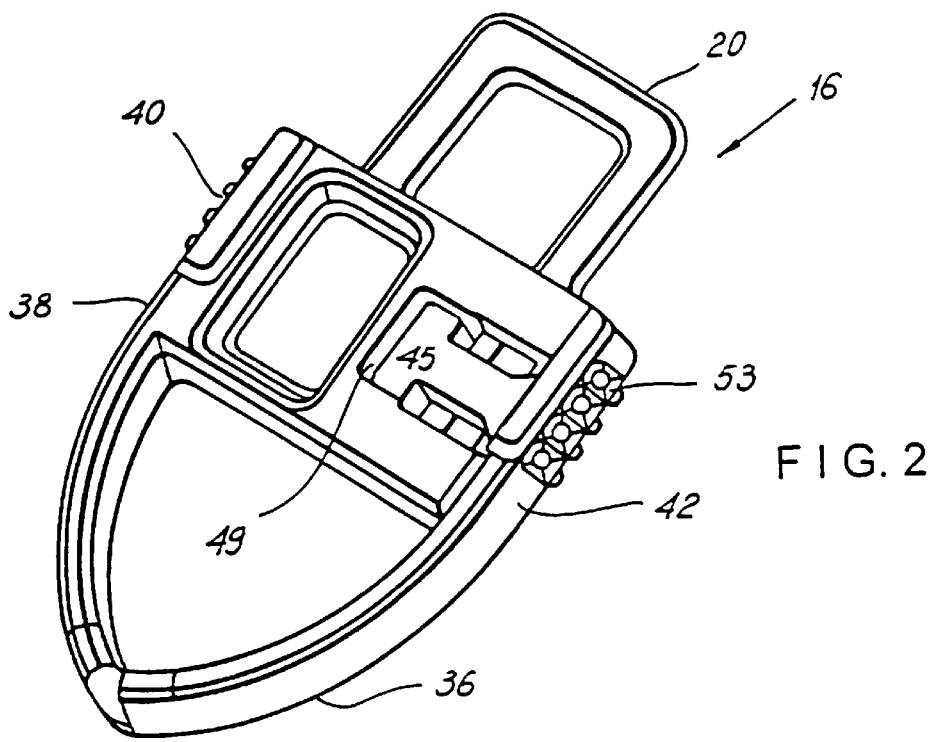
FIG. 2 is perspective view of a typical strap retainer to be used in the child seatbelt assembly of the present invention. The strap retainer is shown in a closed or engaged position.
Figure 3:
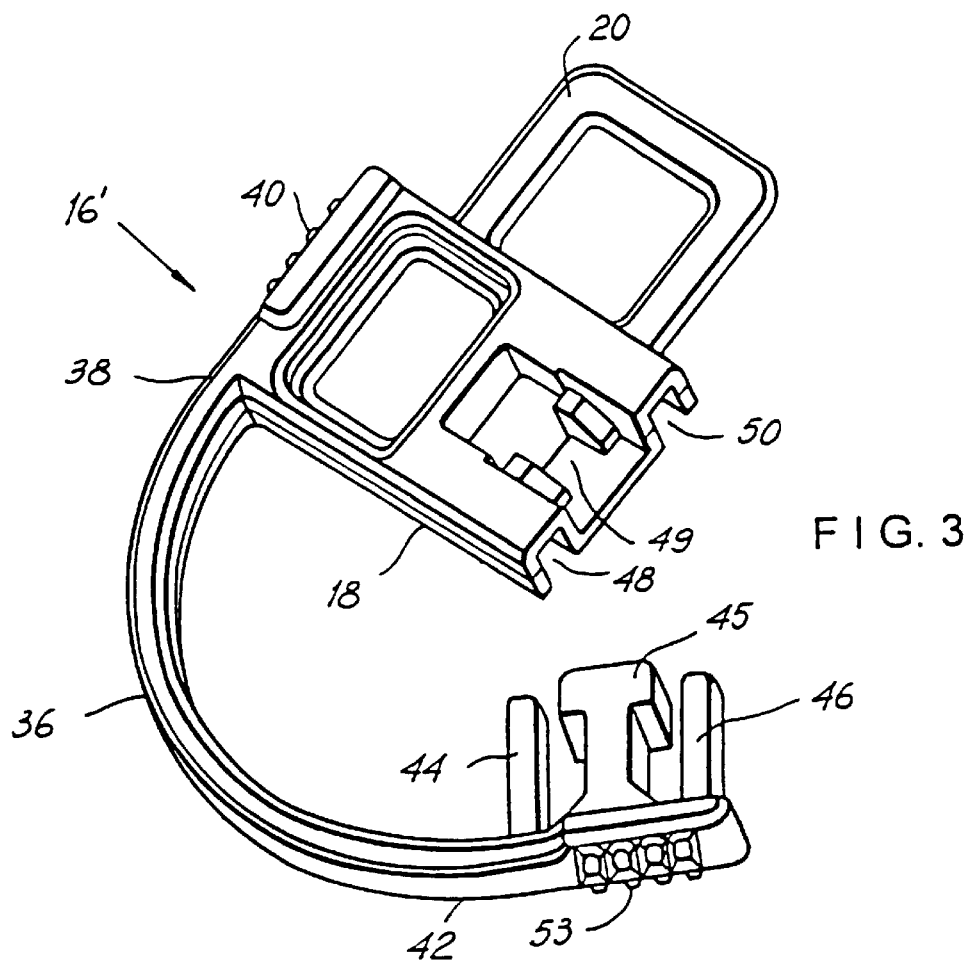
FIG. 3 is a perspective view of a typical strap retainer to be used in the child seatbelt assembly of the present invention. The strap retainer is shown in an open or unengaged position.

Referring now to the drawings in detail wherein like numerals refer to like elements throughout the several views, one sees that FIG. 1 is a plan view of the child seatbelt assembly 10 of the present invention. Child seatbelt assembly 10 includes first nylon web portion 12 and second nylon web portion 14. Those skilled in the art will realize that other materials than nylon web can be used, and that various straps and belts can be used in place of nylon web. First and second nylon web portions 12, 14 may be coated or impregnated with polytetrafluoroethylene (commonly known as TEFLON®) in order to be water-repellent. Nylon web portions 12, 14 may further be highly-reflective and imprinted with an appropriate warning admonishing parents as to the importance of the use of child seatbelts. First nylon web portion 12 is secured to first strap retainer 16 (typically made of plastic) which is shown in the closed position engaging wire-like structural element 100 of the shopping cart or similar structure. First end 17 of first nylon web portion 12 is looped around post element 18 of first strap retainer 16 (see FIGS. 2 and 3 for details of a typical strap retainer 16) and sewed onto sew-tab 20 as evidenced by seam 22. This and other sewing can be supplemented by ultrasonic welding or similar attachment methods. This sewing affixes first nylon web portion 12 to strap retainer 16 regardless of whether strap retainer 16 is in the open or closed position. This sewing is typically intended to be done as part of the manufacturing process so that child seatbelt assembly 10 can be provided to the site, such as a grocery store, as a single assembly without the necessity for on-site sewing or other time-consuming and possibly error-prone assembly.

Second end 24 of first nylon web portion 12 is looped around first element 26 of two-piece latch 28 (typically made of plastic) and further looped around a post portion (not shown) of sliding adjusting buckle 30 (typically made of plastic) and sewn to itself. The structural details of two-piece latch 28 and sliding adjusting buckle 30 are well-known in the prior art and are therefore not discussed in detail herein.

First end 32 of second nylon web portion 14 is sewn to sew-tab 20 of second strap retainer 16' as evidenced by seam 34. Second strap retainer 16' is shown in an open or unengaged position about wire-like structural element 101 of the shopping cart or similar structure. In use, of course, both strap retainers 16, 16' are in the closed or engaged position. As shown in FIG. 1, and in further detail in FIGS. 2 and 3, strap retainers 16, 16' include flexible strap 36 with a first end 38 integral with a first end 40, of post element 18, and a second end 42, integral with guide prongs 44, 46 and detent prongs 45. In the closed position, guide prongs 44, 46 engage corresponding detent channels 48, 50' which extend longitudinally inward within post elements 18. Likewise, detent prongs 45 engage detents channel 49 and are detent fastened therewithin. External gripping ribs 51 are provided at the intersection of flexible straps 36 and post elements 18 in order to provide for increased gripping by the installer. Similarly, external gripping ribs 53 are provided at second ends 42 of flexible straps 36. Further details of strap retainers 16, 16' can be found in application Ser. No. 09/410,539 entitled "Strap Retainer for Child Seatbelts", filed on Oct. 1, 1999 the disclosure of which is incorporated herein by reference. It is envisioned that different strap retainers could be used for the child seatbelt assembly 10 of the present invention.

Second end 52 of second nylon web portion 14 is looped around second element 54 of two-piece latch 28 and sewn to itself.

It is envisioned that child seatbelt assembly 10 will be provided to the installation site, such as a grocery store, as an integral unit as shown in FIG. 1, with both strap retainers 16, 16' in the open position. It is then a simple matter for employees of varying skills to loop the flexible straps 36 about the wire portions 100, 101 of the grocery cart and guide prongs 44, and detent prongs 45 into guide channels 48, 50 and detent channels 49 of post elements 18. It is envisioned that the strap retainers 16, 16' provide a pronounced "click" upon detent engagement in order to aid in proper installation.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A child seatbelt assembly including:

a first strap portion with a first end and a second end;

a second strap portion with a third end and a fourth end;

a latch assembly including a first latch element attached to said second end and a second latch element attached to said third end;

a first retainer strap assembly including a first post element with first detent element and a first strap element with second detent element, said first retainer strap assembly being in an open position when said first detent element is free of engagement with said second detent element, and being in a closed position when said first detent element engages said second detent element;

a second retainer strap assembly including a second post element with third detent element and a second strap element with fourth detent element, said second retainer strap assembly being in an open position when said third detent element is free of engagement with said fourth detent element, and being in a closed position when third detent element engages said fourth detent element;

said first retainer strap assembly being affixedly secured to said first end in both said open position and said closed position of said first retainer strap assembly;

said second retainer strap assembly being affixedly secured to said fourth end in both said open position and said closed position of said second retainer strap assembly.

2. The child seatbelt assembly of claim 1 further including a first generally planar sew-tab extending from said first post element and a second generally planar sew-tab extending from said second post element, whereby said first end is attached to said first retainer strap assembly by sewing through both said first strap portion and said first sew-tab, and said fourth end is attached to said second retainer strap assembly by sewing though both said second strap portion and said second sew-tab.

3. The child seatbelt assembly of claim 2 wherein said first detent means and said third detent means include female elements and said second detent means and said fourth detent means include male elements.

4. The child seatbelt assembly of claim 3 wherein said female elements extend longitudinally with said first post element and said second post element.

* * * * *

(12) EX PARTE REEXAMINATION CERTIFICATE (6799th)
United States Patent
Giampavolo et al.

(10) Number: US 6,101,687 C1
(45) Certificate Issued: May 5, 2009

(54) CHILD SEATBELT ASSEMBLY

(75) Inventors: Paul F. Giampavolo, Milton, NH (US); John S. Pontaoe, Chicago, IL (US)

(73) Assignee: Safe-Strap Company, Inc., Somersworth, NH (US)

Reexamination Request:
No. 90/010,110, Feb. 15, 2008

Reexamination Certificate for:
Patent No.: 6,101,687
Issued: Aug. 15, 2000
Appl. No.: 09/410,538
Filed: Oct. 1, 1999

(51) Int. Cl.
*A44B 21/00* (2006.01)

(52) U.S. Cl. ........................ 24/302; 24/264 AL; 24/614; 24/615

(58) Field of Classification Search .................. None
See application file for complete search history.

(56) References Cited

U.S. PATENT DOCUMENTS 5,781,970 A    7/1998  Anscher
6,044,528 A    4/2000  Schottin

OTHER PUBLICATIONS

FDC-5500 Seatbelt, Davis Aircraft Products Inc. Catalogue 1975 ("Davis Seatbelt").

*Primary Examiner*—Joseph A. Kaufman

(57) ABSTRACT

The child seatbelt assembly is provided on-site as a single piece and includes two nylon web seatbelt portions which latch to each other by way of a releasable buckle. Both seatbelt portions are permanently affixed to strap retainers by means of sewing or attaching permanently through the seatbelt portions or through a sew-tab included as part of the strap retainers. This provides that the seatbelt portions are affixed to the strap retainers regardless of whether or not the strap retainers are in the open or closed position. This further allows the child seatbelt assembly to be provided to an installation site, such as a grocery store, as a single assembly.

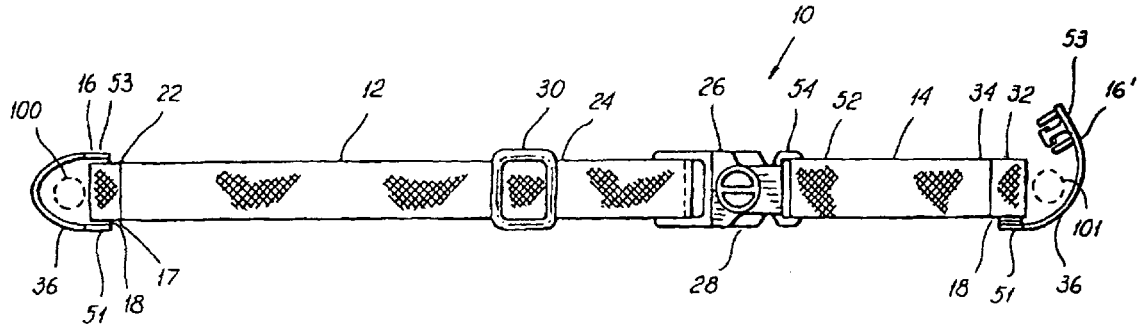

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–4 is confirmed.

* * * * *